United States Patent [19]
Miau et al.

[11] Patent Number: 5,351,559
[45] Date of Patent: Oct. 4, 1994

[54] T-SHAPE VORTEX SHEDDER WHEREIN THE BLUFF BODY EXTENDS ACROSS THE DIAMETER OF A CIRCULAR PIPE AND HAS A LENGTH TO WIDTH RATIO BETWEEN 1.56 AND 2.0

[75] Inventors: Jiun-Jih Miau; Chi-Cheng Yang; J. H. Chou; Tzu-Liamg Chen, all of Tainan, Taiwan

[73] Assignee: National Science Council, Taipei, Taiwan

[21] Appl. No.: 114,100

[22] Filed: Aug. 31, 1993

[51] Int. Cl.$^5$ ............................................... G01F 1/32
[52] U.S. Cl. ................................. 73/861.24; 73/861.22
[58] Field of Search ............ 73/861.22, 861.23, 861.24

[56] References Cited

U.S. PATENT DOCUMENTS

| | | | |
|---|---|---|---|
| 4,448,081 | 5/1984 | Kolitsch et al. | 73/861.22 |
| 4,464,939 | 8/1984 | Corpron | 73/861.24 |
| 4,891,990 | 1/1990 | Khalifa et al. | 73/861.24 |
| 4,984,470 | 1/1991 | Hayward et al. | 73/861.22 |
| 5,170,671 | 12/1992 | Miau et al. | 73/861.22 |

OTHER PUBLICATIONS

Article entitled "A New General Purpose Liquid Flowmeter" by H. V. Mangin, Tappi 58 65 (1975).
Article entitled "Vortex Flowmetering Challenges the Accepted Techniques" by D. J. Lomas, Control & Instrumentation 7, 36 (1975).
Article entitled "Survey of Pipeline Flowmeters" by R. W. W. Scott, et al. J. Phys. E 15, 967 (1982).

Primary Examiner—Richard E. Chilcot, Jr.
Assistant Examiner—William L. Oen
Attorney, Agent, or Firm—Michael D. Bednarek

[57] ABSTRACT

A T-shape vortex shedder comprises a bluff body having a width W between upper and lower ends thereof and an extended plate having a length L in the fluid flow direction which is perpendicular to the bluff body. The bluff body and the extended plate form a T-shape vortex shedder with a T-shape cross section. When this T-shape vortex shedder is placed in a fluid motion within a circular pipe, the bluff body is located upstream of the fluid flow, and the extended plate is located downstream of the fluid flow, such that vortex shedding is produced at the upper and lower ends of the bluff body. The T-shape vortex shedder is characterized in that the L/W ratio is approximately 1.56~2.0, and the fluid flow produces steady vortex shedding when the Reynolds number of the fluid flow is approximately $2.4 \times 10^3 \sim 3.2 \times 10^4$. Furthermore, two hollow pressure passages are established at the upper and lower ends of the bluff body, such that the vortex shedding frequency can be measured by a pressure transducer located outside of the circular pipe. This vortex shedding frequency is linear in relation to the Reynolds number, such that the T-shape vortex shedder of the present invention provides a highly accurate flowmeter.

8 Claims, 11 Drawing Sheets

L/W=0

L/W=1.56

L/W=2.0

L/W=3.13

T-SHAPE VORTEX SHEDDER WHEREIN THE BLUFF BODY EXTENDS ACROSS THE DIAMETER OF A CIRCULAR PIPE AND HAS A LENGTH TO WIDTH RATIO BETWEEN 1.56 AND 2.0

BACKGROUND OF THE INVENTION

1. Field of the Invention

The present invention relates to a flowmeter for detecting the flowrate in a pipe or tube and in particular to a T-shape vortex shedder which is optimized in shape for use as a flowmeter.

2. Description of the Prior Art

Vortex shedding meters are the most common used among fluid oscillatory type meters. A vortex flowmeter detects frequency of vortex shedding from a bluff body which, as learned from fluid dynamics, is linearly proportional to the fluid velocity under certain conditions. Relevant papers discussing this phenomenon can be found in: H. V. Magin, Tappi 58 65 (1975); D. J. Lomax, Control Instrument 7, 36 (1975); and T. J. S. Brain and R. W. W Scott, J.Phys. E 15, 967 (1982).

Conventional vortex flowmaters include a two dimensional bluff body accommodating a pressure sensor or a probe for detecting vortex shedding frequencies. If a bluff body is placed in a fluid flow, as shown in FIG. 1, under certain conditions, when the fluid flows over the upper and lower ends $1a$ and $1b$ of this bluff body 1, the fluid will separate at an upper front end $1a1$ and a lower front end $1b1$ of the bluff body 1 and produce vortex shedding in the downstream direction continuously and alternately. The shedding frequency is defined as the number of vortices developed in a certain time. Since vortex shedding produces a variation in fluid pressure, the vortex shedding frequency f can be determined by the variation of pressure, and then the fluid flowrate can be calculated according to the determined frequency f. The operating theories of such vortex shedding meters are further explained in U.S. Pat. No. 5,170,671, issued to Miau et al., the disclosure of which is incorporated herein by reference.

All current vortex flowmeters are designed on the above principle. However, in order to precisely determine a broad range of fluid flowrates, the design of the bluff body and the method of the measurement of frequency differ in many ways. The quality of a flowmeter mainly depends on the quality of the signals of the vortex shedding frequency. When the vortex shedding becomes steadier and the size of vortex becomes more definite, the quality of the signals of the vortex shedding frequency improves.

SUMMARY OF THE INVENTION

It is an object of the present invention to provide a kind of T-shape vortex shedder which produces steady vortex shedding.

It is another object of the present invention to provide a kind of T-shape vortex shedder which produces high quality vortex shedding frequency signals.

It is another object of the present invention to provide a T-shape vortex shedder which can serve as a flowmeter for accurately measuring a broad range of fluid flowrates.

It is another object of the present invention to provide a T-shape vortex shedder which can serve as a precise flowmeter.

It is yet another object of the present invention to provide an improved method for calculating a fluid flowrate with a T-shape vortex shedder.

Additional objects, advantages and novel features of the invention will be set forth in the description which follows, and will become apparent to those skilled in the art upon reading this description or practicing the invention. The objects and advantages of the invention may be realized and attained by the appended claims In order to achieve the foregoing and other objects, a T-shape vortex shedder is provided which is disposed within a circular pipe through which fluid flows for producing a vortex in the fluid flow. The shedder includes an extended plate having a central plane and a bluff body having a front surface facing the fluid flow and an outer peripheral surface, the front surface being perpendicular to the central plane of the extended plate which is secured to the bluff body. The shedder is characterized in that the ratio L/W of length L of the extended plate in the flow direction to the width W of the front surface of the bluff body is within the range from 1.56 to 2.0 when the Reynolds number of the fluid flow in the circular pipe is between $2.4 \times 10^3$ and $3.2 \times 10^4$.

In a further aspect of the present invention, a method for calculating a fluid flow rate is provided, comprising the steps of: (a) preparing a T-shape vortex shedder and placing the T-shape vortex shedder within a circular pipe; (b) providing a pressure transducer outside of the circular pipe in communication with the T-shape vortex shedder; (c) measuring the frequency f of vortex shedding caused by the T-shape vortex shedder by using the pressure transducer; and (d) calculating the fluid flowrate using a predetermined relationship between frequency of vortex shedding f and the flowrate.

The present invention can be more fully understood with reference to the following detailed description of the preferred embodiments and the accompanying drawings.

BRIEF DESCRIPTION OF THE DRAWING

The accompanying drawings, which are incorporated in, and form a part of, the specification, illustrate an embodiment of the present invention and, together with the description, serve to explain the principles of the invention. In the drawings.

DETAILED DESCRIPTION OF THE PREFERRED EMBODIMENT

Figure 1:
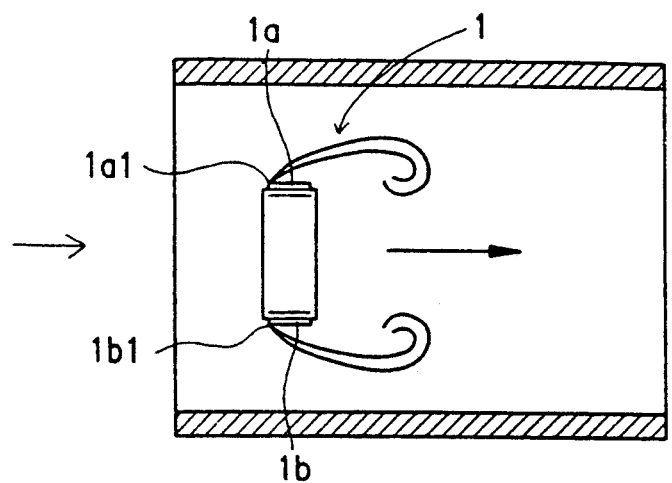
FIG. 1 shows a bluff body within a pipe flow.
Figure 2:
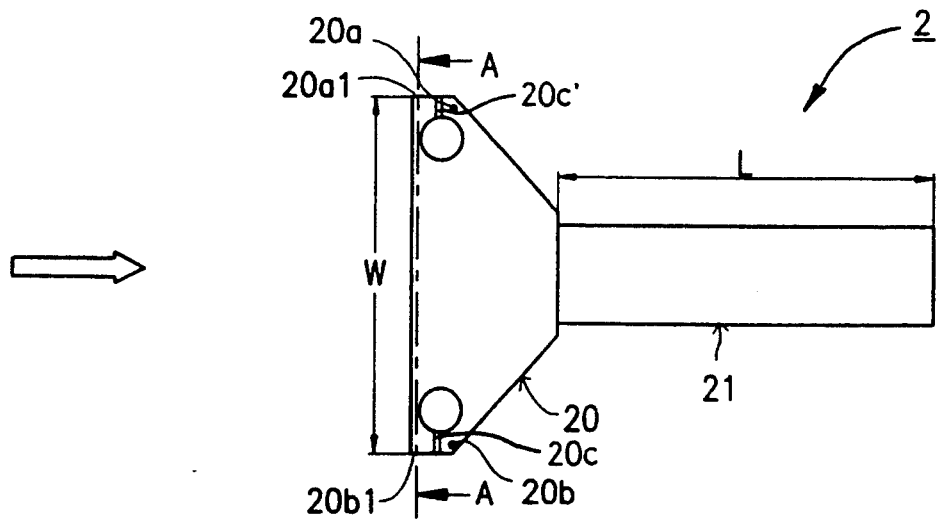
FIG. 2 shows a two dimensional view of a T-shape vortex shedder of the present invention.

Referring now to FIG. 2, a two dimensional view of a T-Shape vortex shedder 2 according to the present invention is illustrated, where W is the distance from an upper front end 20a1 of an upper end 20a to a lower front end 20b1 of a lower end 20b of the bluff body, and L is the length of an extended plate 21 which is connected to the bluff body 20 on a downstream side. In addition, holes 20c and 20c' are pressure transmit passages which are connected to a pressure transducer 8 (FIG. 3) located outside of the circular pipe 4.

Figure 3:
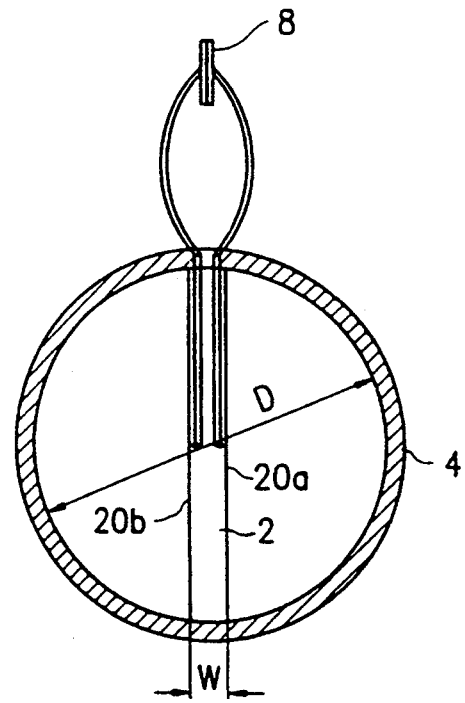
FIG. 3 shows a front view of a T-shape vortex shedder of the present invention located in a circular pipe.

The experimental device, procedure and results of the present invention will be described in detail below. Referring to FIG. 3, a T-Shape vortex shedder 2 according to the present invention is shown fixed in a circular pipe 4 of a wind tunnel with a pressure transducer 8 mounted thereto. The pressure transducer 8 transmits pressure signals measured in the upper end 20a and the lower end 20b of the bluff body 20 to a signal receiving apparatus (not shown) located outside of the circular pipe 4.

Figure 4:
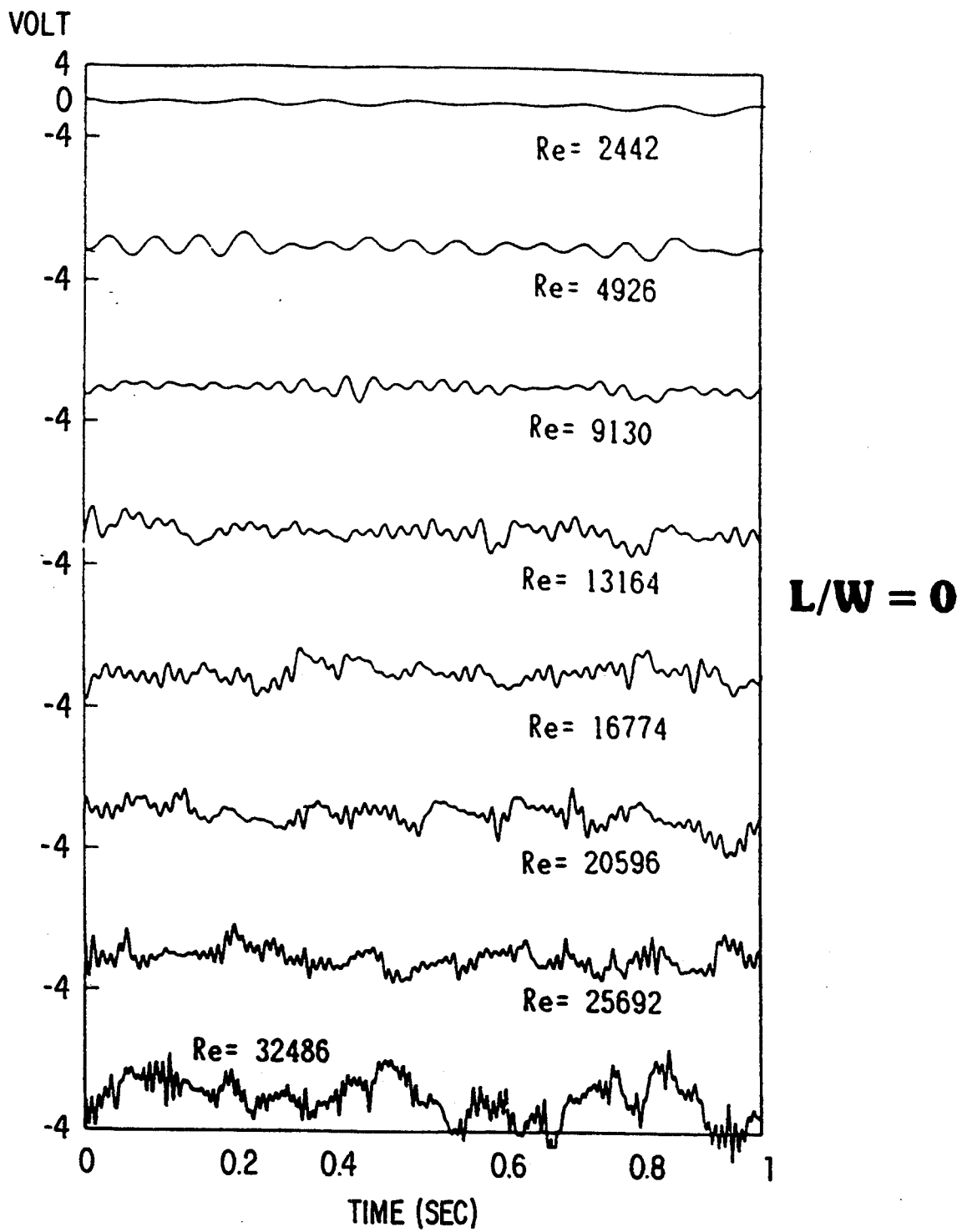
FIGS. 4, 5, 6 and 7 show the pressure signals obtained in the T-shape vortex shedder of the present invention under various Reynolds number conditions for the cases of L/W=0, 1.56, 2.0 and 3.13, respectively.
Figure 8:
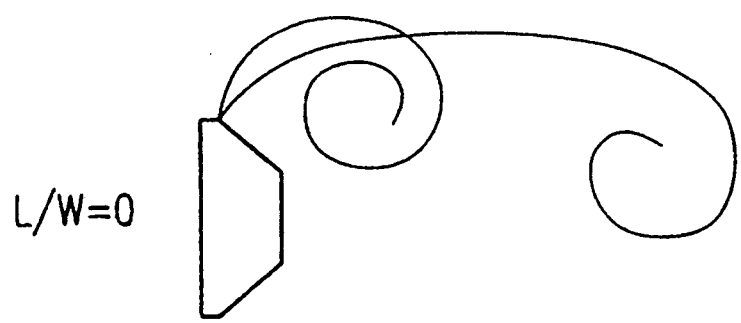
FIGS. 8, 9, 10 and 11 show the geometry and vortex shape of the T-shape vortex shedder of the present invention for the cases of L/W=0, 1.56, 2.0 and 3.13, respectively.

Referring to FIG. 4, pressure signals generated by vortex shedding under different Reynolds numbers Re for the case of L/W=0 are shown (Re is defined according to known fluid mechanics principles as $U_oD/v$, where $U_o$ is the average velocity of the fluid, D is the inside diameter of the circular pipe 4, and $v$ is the dynamic-viscosity of the fluid). As shown in FIG. 4, when there is no extended plate 21 connected to the bluff body 20, the pressure signals present irregular shapes for all the Reynolds numbers tested. This indicates that there is no steady vortex shedding for any of the Reynolds numbers, which means that the size and location of the vortex is changing, as shown in FIG. 8.

Figure 5:
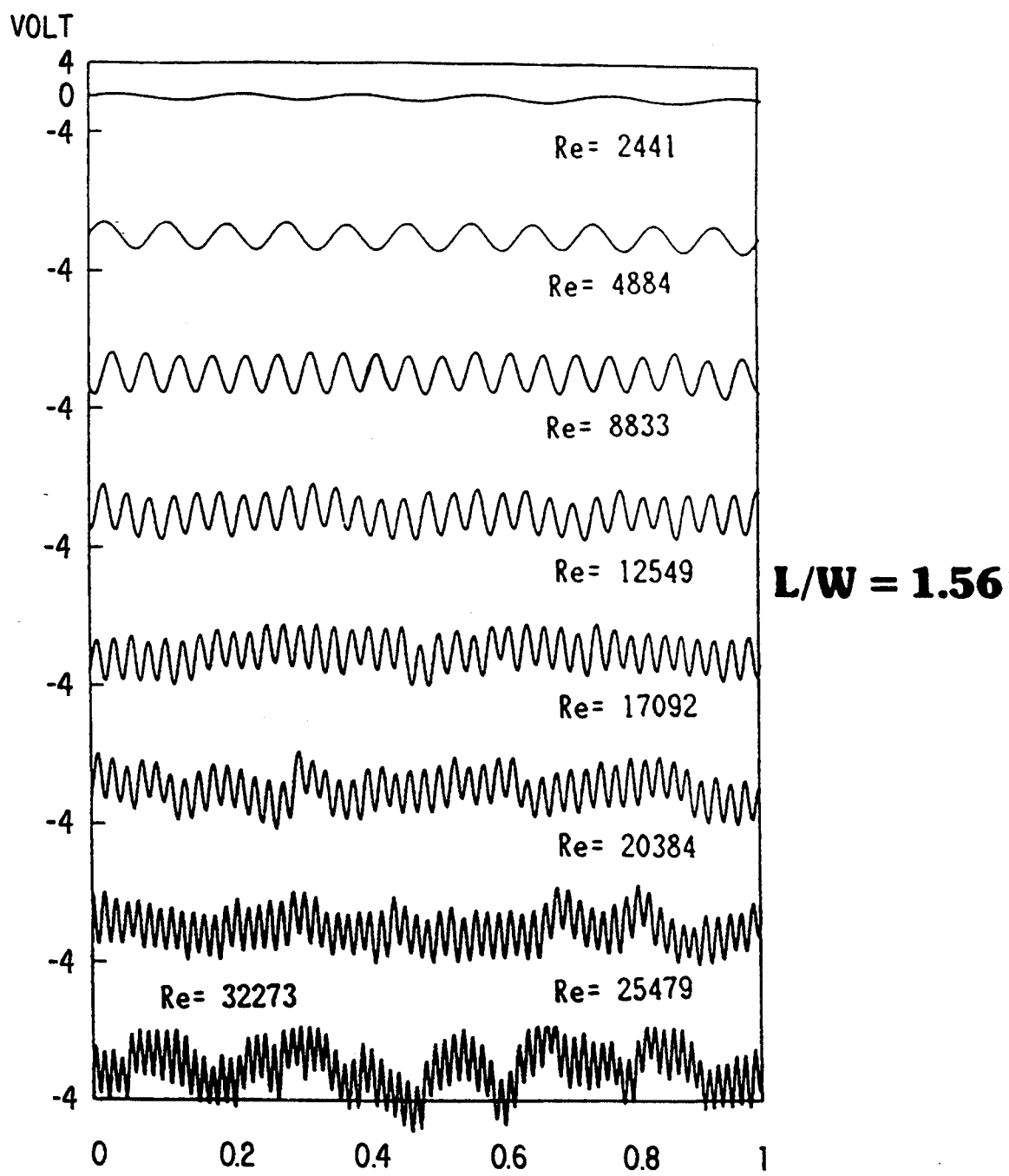
Figure 9:
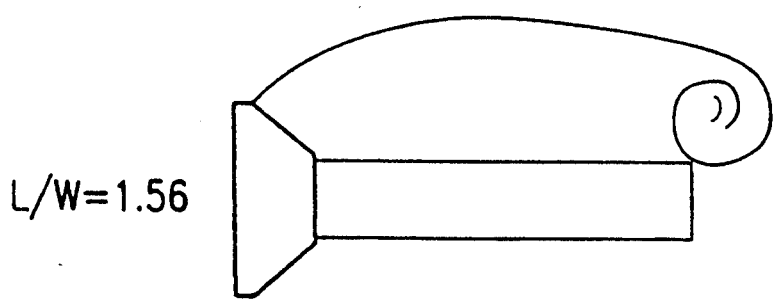

Referring to FIG. 5, pressure signals generated by vortex shedding under different Reynolds numbers for the case of L/W=1.56 are shown. As shown in FIG. 5, when the Reynolds number range is about $2.4\times10^3 \sim 3.2\times10^4$, all the pressure signals become regular after the connection of an extended plate 21 downstream of the bluff body 20. Therefore, the extended plate 21 improves the quality of the pressure signal by causing the vortex to shed steadily. As shown in FIG. 9, the location of the vortex is fixed.

On the other hand, for the case of L/W=1.56, as the Reynolds number Re increases, the low frequency wave which is made from several high frequency small waves begins to fluctuate. This low frequency component of pressure fluctuation is related to the three dimensional characteristics of the fluid. However, the energy of the low frequency component of the pressure signals made from the three dimensional characteristics of the fluid is very low as compared with the energy of the high frequency component of the pressure signals such that the vortex shedding still remains steady.

Figure 6:
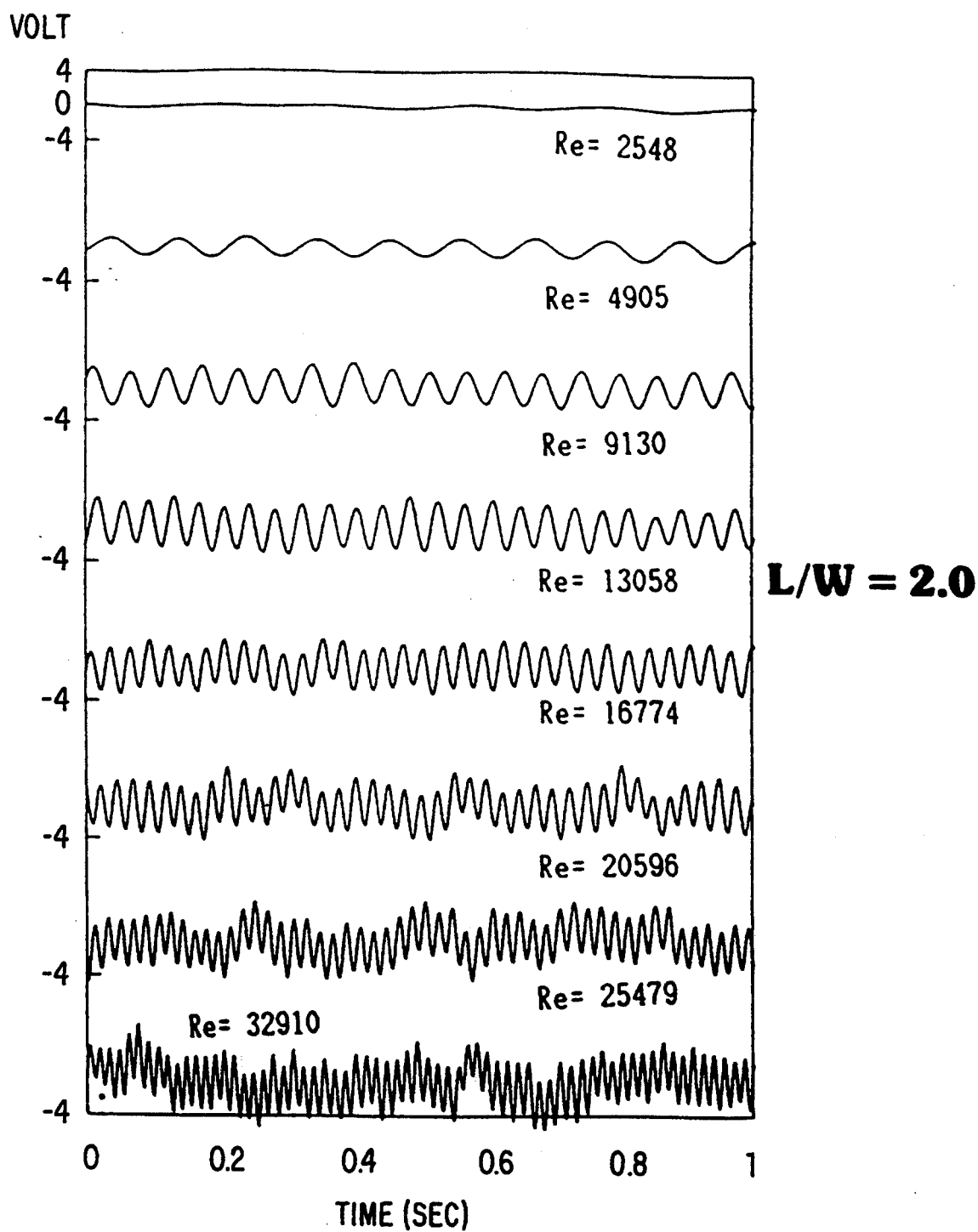
Figure 10:
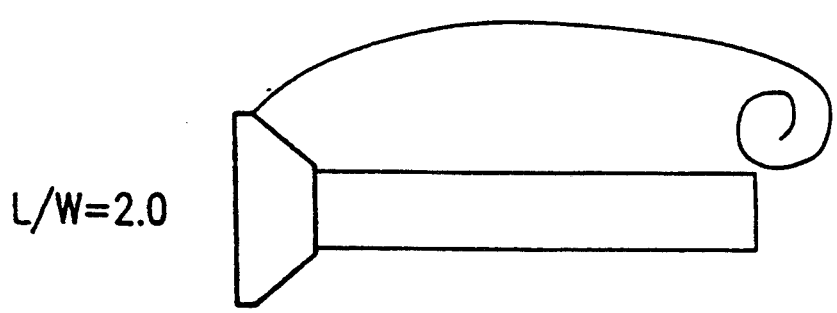

Referring to FIG. 6, pressure signals generated by vortex shedding under different Reynolds numbers for the case of L/W=2 are shown. When FIG. 6 is compared with FIG. 5, we find that the energy of the low frequency component of the pressure signals further diminishes. As a result, the vortex shedding becomes more stable as shown in FIG. 10. Therefore, the pressure signals present the best wave shape in the case where L/W=2.

Figure 7:
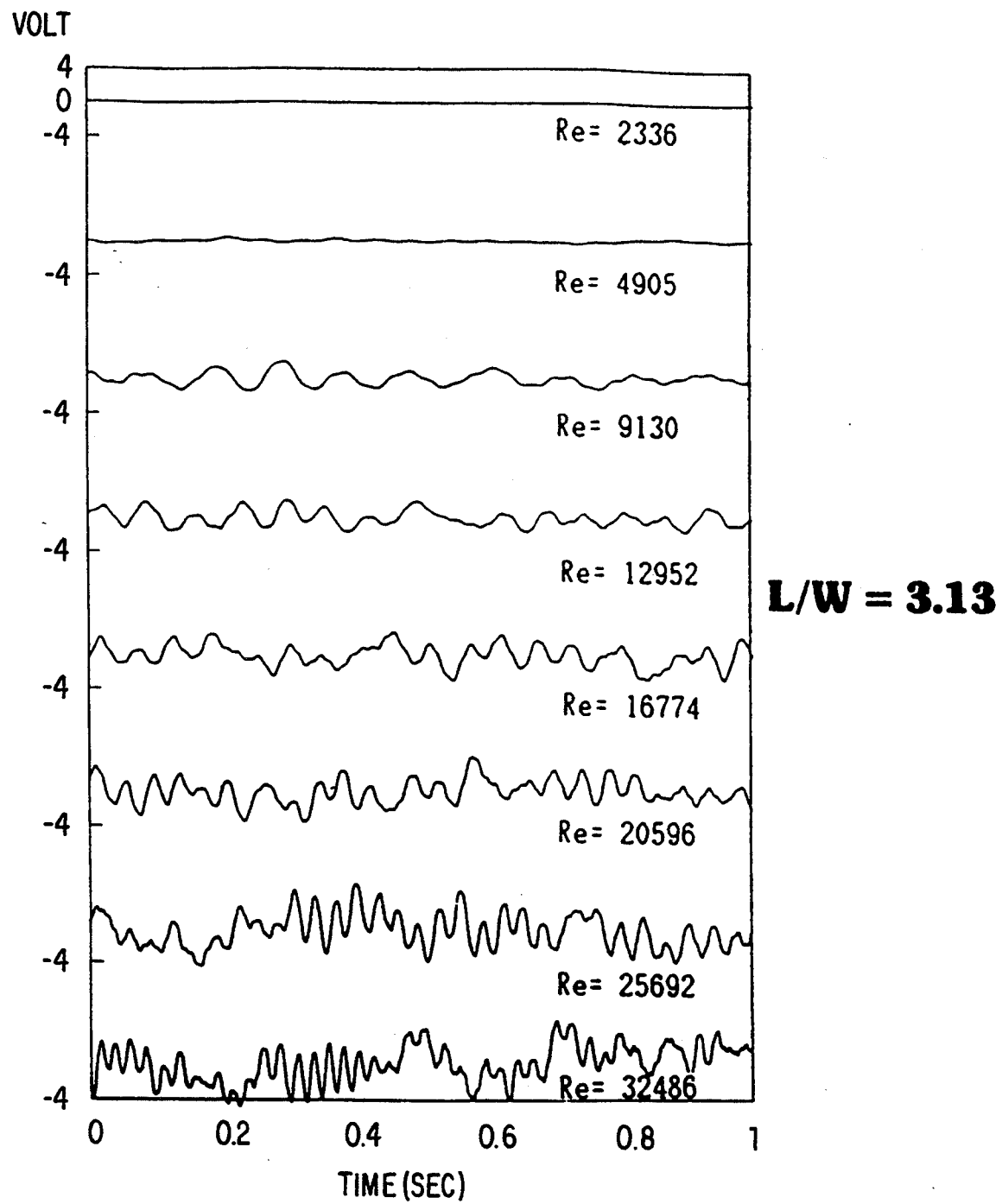
Figure 11:
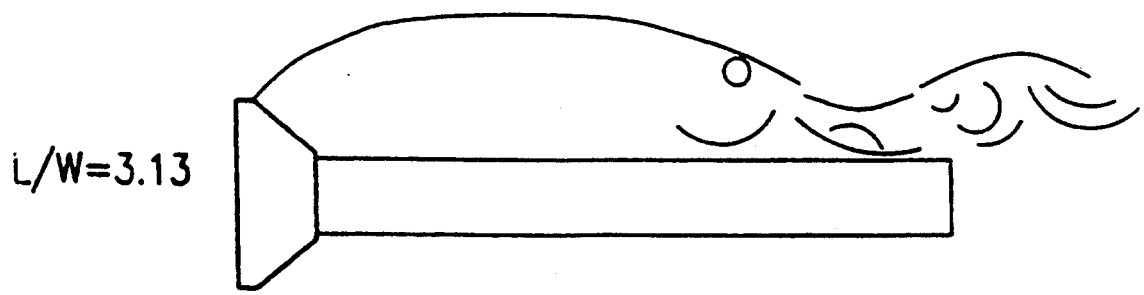

Referring to FIG. 7, the pressure signals generated by vortex shedding under different Reynolds numbers for the case of L/W=3.13 are shown. As shown in FIG. 7, the quality of the pressure signal curves under different Reynolds numbers deteriorates as compared to the pressure signal curves of FIG. 6. That is to say, if the length of the extended plate 21 becomes too long, neither the low frequency component of the pressure fluctuation can be inhibited, nor can the high frequency component of the pressure fluctuation be generated. This is because the vortex cannot form a complete structure at the trailing end of the extended plate 21, as shown in FIG. 11.

Figure 12:
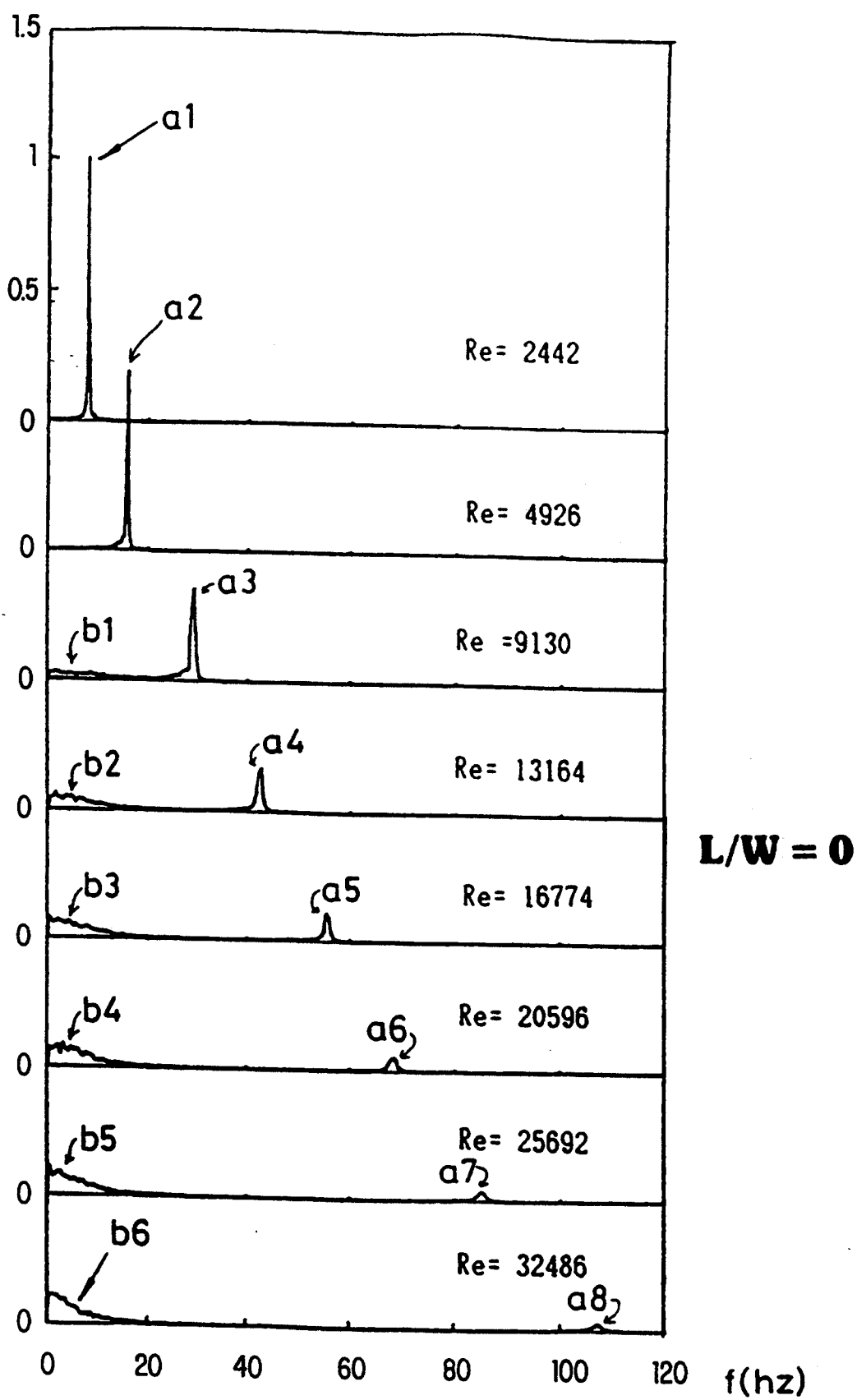
FIGS. 12, 13, 14 and 15 show the frequency spectra of the pressure signals obtained in the T-shape vortex shedder of present invention under various Reynolds number conditions for the cases of L/W=0, 1.56, 2.0 and 3.13, respectively.

Furthermore, when the vortex is shedding, the relative strength of the high frequency component and the low frequency component can be found from the figures of frequency spectra of the pressure signals. Referring to FIG. 12, which is for the case of L/W=0, the frequency spectra of pressure signals for the Reynolds numbers of FIG. 4 are shown. From FIG. 12, it can be seen that only high frequency components a1 and a2 exist when the Reynolds numbers are 2442 and 4926, respectively. This means that only a steadily shedding vortex exists at those two Reynolds numbers. But as the Reynolds number increases to 9130, a low frequency component b1 appears. When the Reynolds numbers become higher, the intensities of the low frequency components also become larger, as shown by b1~b6. On the other hand, the intensities of the high frequency components a3-a8 become smaller and smaller as the Reynolds number increases such that the intensity of the high frequency component approaches zero. This means that the pressure signals in FIG. 4 produce irregular low frequency fluctuations.

Figure 13:
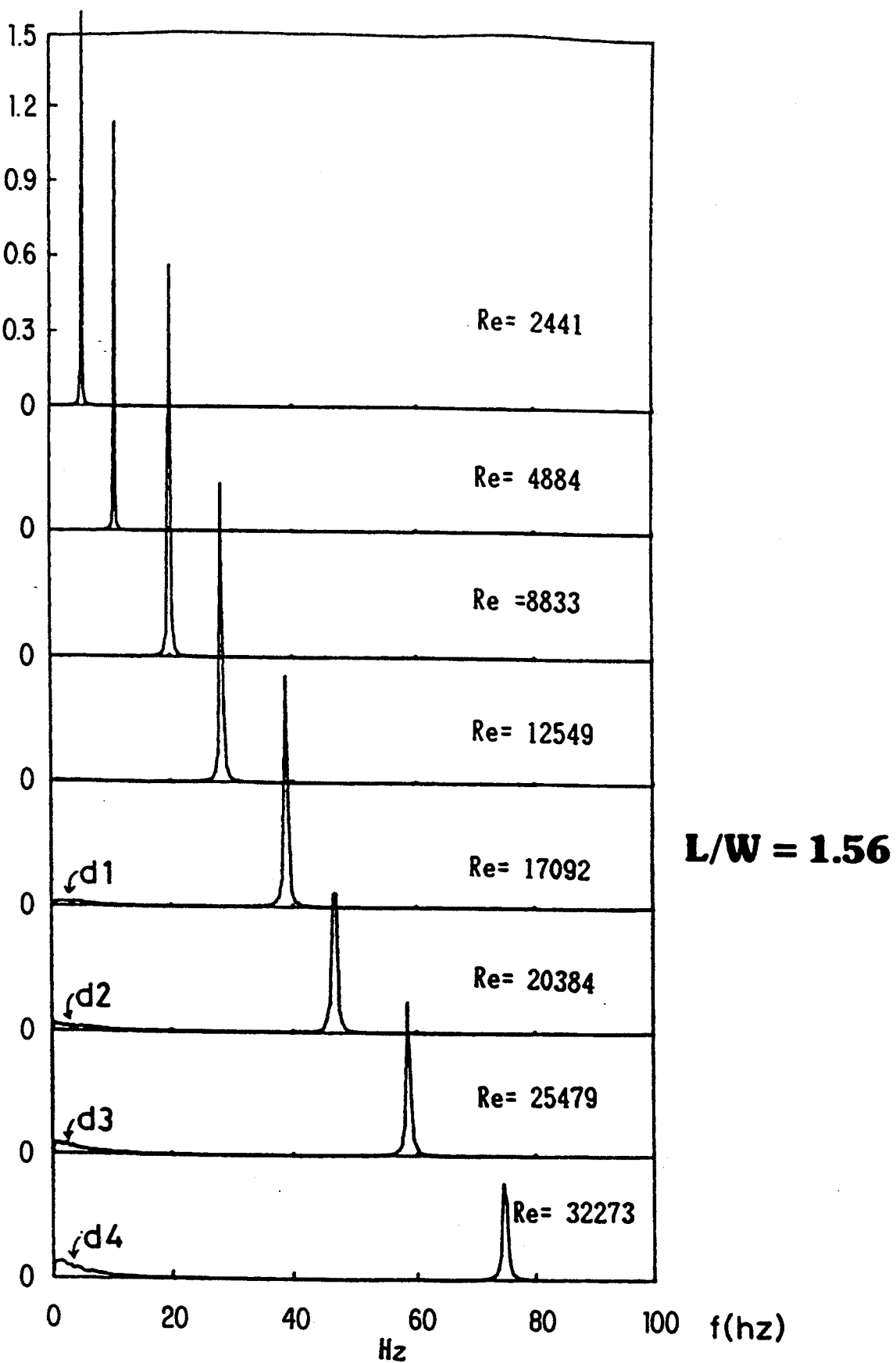

Referring to FIG. 13, for the case of L/W=1.56, the frequency spectra of pressure signals for the Reynolds numbers of FIG. 5 are shown. Comparing FIG. 13 with FIG. 12 for the same Reynolds number, it is seen that if an extended plate 21 with L/W=1.56 is connected to the bluff body, the intensity of the low frequency component diminishes and the intensity of the high frequency component increases. For example, when the Reynolds number is approximately $9\times10^3$, the low frequency component b1 which appears in FIG. 12 disappears in FIG. 13.

Figure 14:
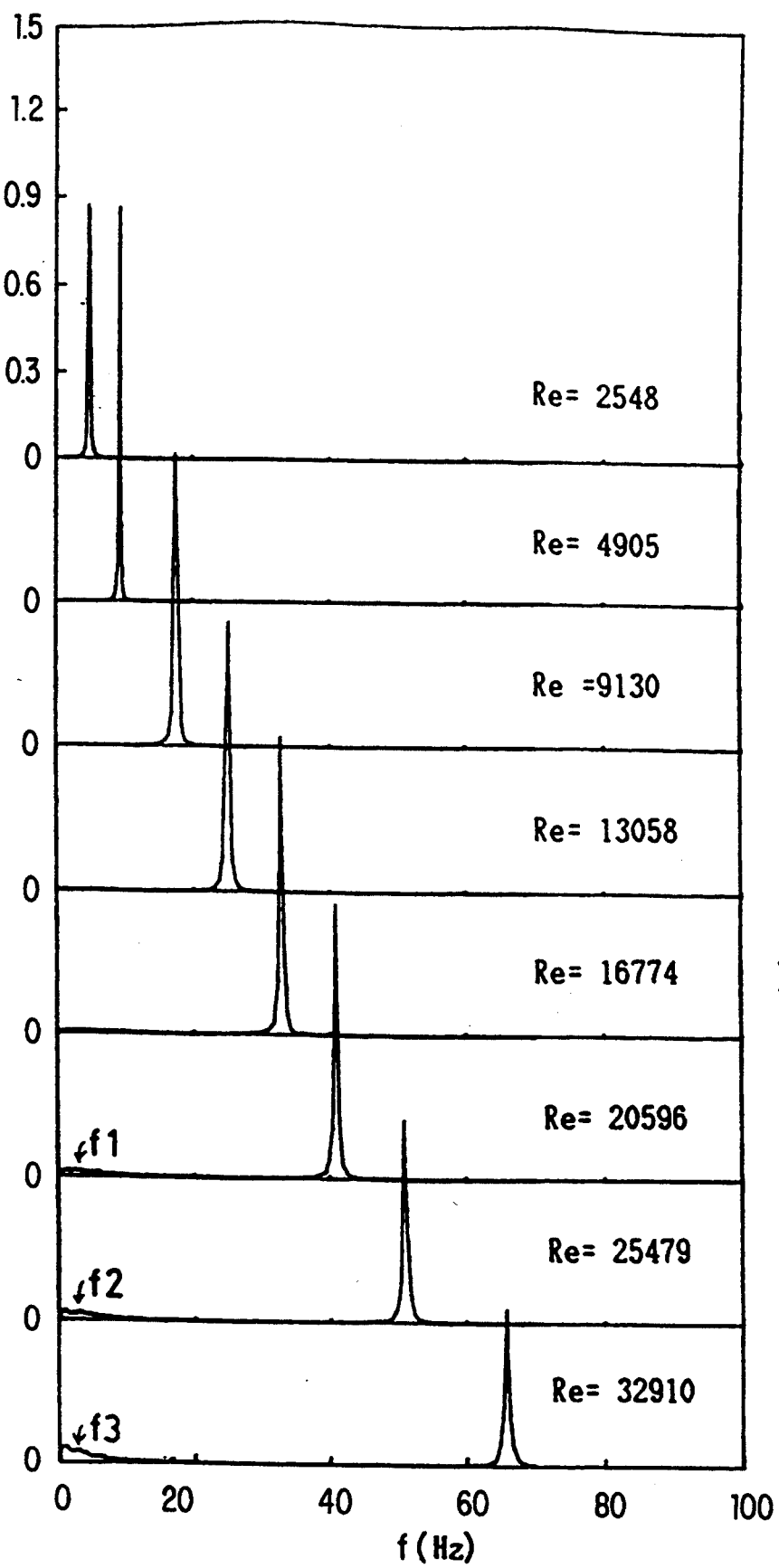

Referring to FIG. 14, for the case of L/W=2.0, the frequency spectra of pressure signals for the Reynolds numbers of FIG. 6 are shown. Comparing FIG. 14 with FIG. 13, it can be seen that the low frequency component of the pressure signal fluctuation in FIG. 14 becomes less pronounced than that in FIG. 13. In FIG. 13, low frequency components d1~d4 are found corresponding to four Reynolds numbers. While in FIG. 14, low frequency components f1~f3 are found corresponding to only three Reynolds numbers.

Figure 15:
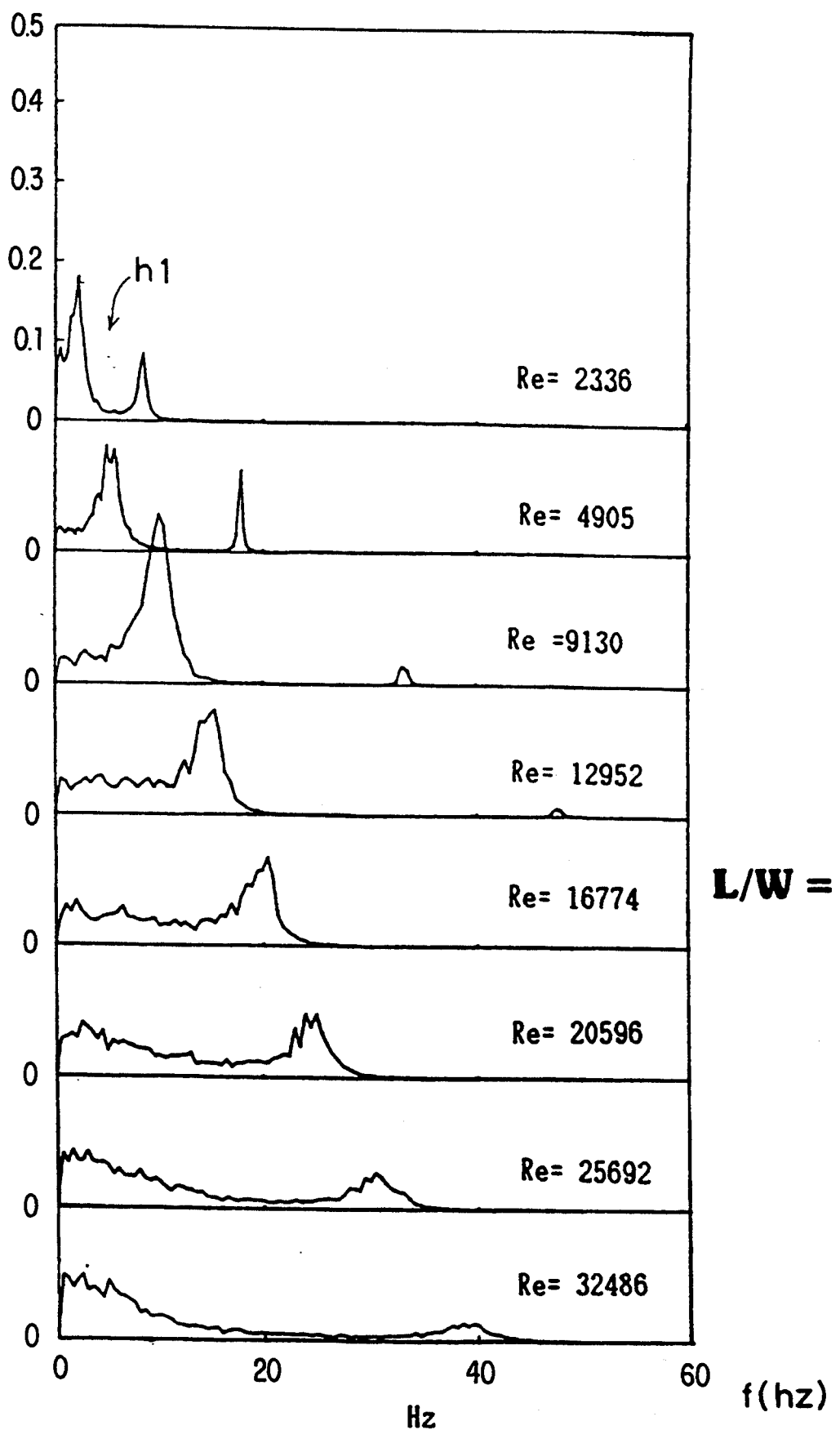

Referring to FIG. 15, for the case of L/W=3.13, the frequency spectra of pressure signals for the Reynolds numbers of FIG. 7 are shown. From FIG. 15, it can be seen that there is no high frequency component when L/W=3.13, but rather, only a low frequency component with a wide frequency range. Steady vortex shedding virtually disappears indicating there is almost no definite vortex flow at all under the conditions of FIG. 15.

Figure 16:
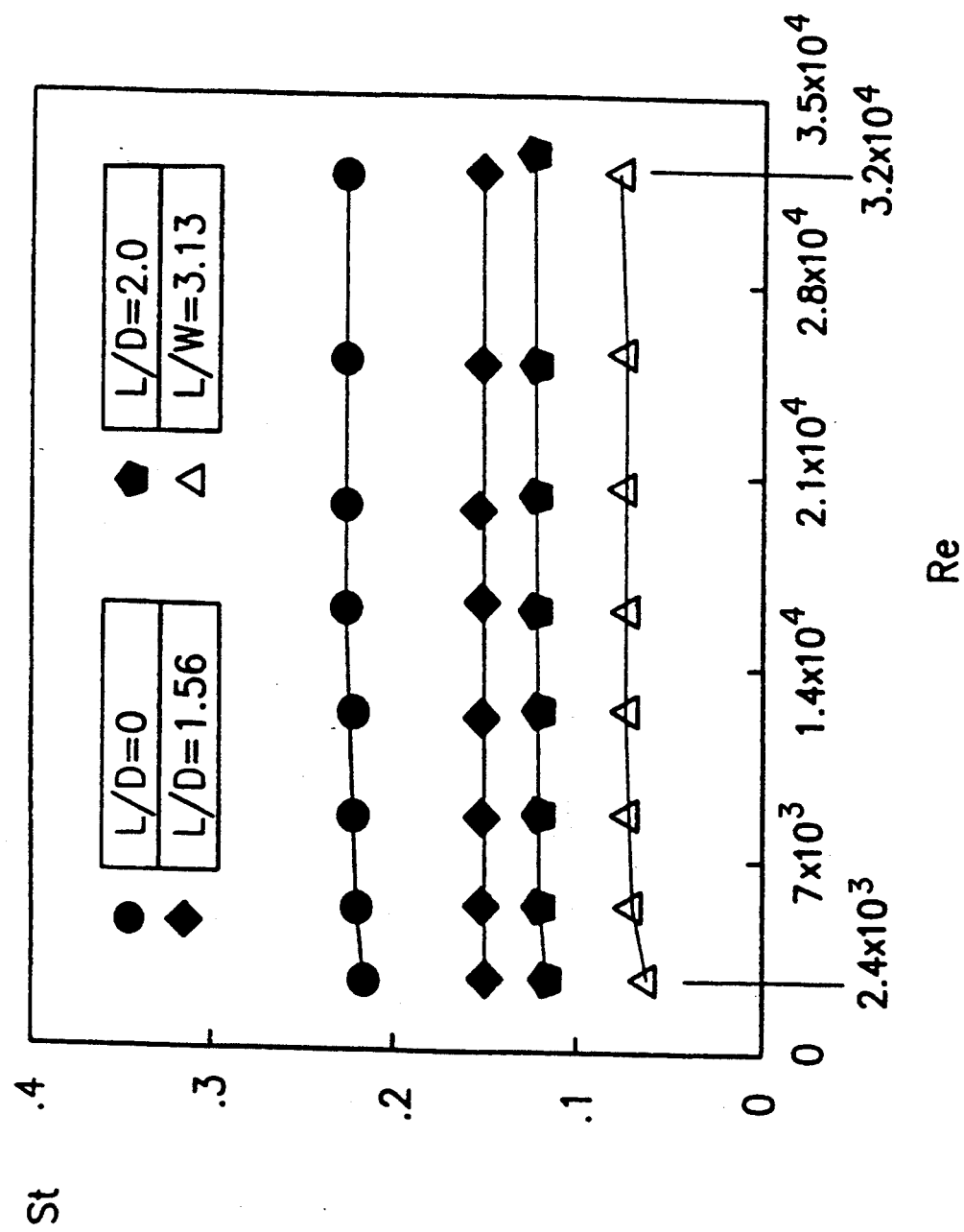
FIG. 16 is a graph showing dimensionless vortex frequencies versus Reynolds numbers for different values of L/W.

Referring to FIG. 16, the relation between dimensionless vortex frequency St and Reynolds number Re is shown, where the dimensionless vortex frequency is defined as $St=f*W/U_o$, where f is the vortex shedding frequency, W is the width of the front surface of the bluff body and $U_o$ is the average velocity of the fluid. As shown in FIG. 16, the ratio between the calculated dimensionless frequency St and the Reynolds number Re varies for different L/W ratios. When the Reynolds number is about $2.4 \times 10^3 \sim 3.2 \times 10^4$, it can be seen from FIG. 16 that the dimensionless frequency St versus the Reynolds number Re is linear for the cases of L/W=0, 1.56 and 2.0. However, for the case of L/W=3.13, this linear relation is lacking. Therefore, when the L/W ratio is over 2.0, there is no linear relation found between the dimensionless frequency St and Reynolds number Re.

The following Table 1 expresses each of the linear drawings of FIG. 16 as linear formulas determined by linear regression. In addition, a correlation coefficient of the linear formula for each L/W ratio is shown in the table. It can be seen that the correlation coefficient is highest for the case of L/W=1.56.

TABLE 1

| L/W | Dimensionless Vortex Frequency Formula | Correlation Coefficients |
| --- | --- | --- |
| L/W = 0 | ST = 0.2202 + 1.2685 × $10^{-7}$Re | 0.9623 |
| L/W = 1.56 | ST = 0.1526 + 1.3118 × $10^{-7}$Re | 0.9934 |
| L/D = 2.0 | ST = 1.1273 + 3.2914 × $10^{-7}$Re | 0.9498 |
| L/D = 3.13 | ST = 0.0718 + 3.8370 × $10^{-7}$Re | 0.7481 |

In summary, the best range of L/W for the T-Shape vortex shedder according to the present invention is about 1.56~2.0, and the corresponding Reynolds number range is about $2.4 \times 10^3 \sim 3.2 \times 10^4$.

The primary function of the present invention is to employ an extended plate 21 to obtain a steady vortex shedding frequency f, and then obtain a linear relation between the dimensionless frequency St and the Reynolds number Re. The invention can then be applied to obtain a high quality flowmeter by the known linear relation between the Reynolds number Re and the flowrate. Another advantage of the present invention is that using the extended plate 21 will make the vortex flowmeter of the present invention applicable for a larger Reynolds number range. For example, the ratio of highest Reynolds number to lowest Reynolds number of the described embodiment of the present invention is $3.2 \times 10^4 / 2.4 \times 10^3 = 13$.

Finally, it is noted that the ratio of the cross-sectional area of the bluff body 20 to the inside cross-sectional area of the circular pipe 4 is about 0.2703. Hence, the blockage ratio of the present invention (i.e., the percentage of pipe area blocked by the bluff body 20) is about 27.03%.

Having described the present invention as related to the embodiment shown in the accompanying drawings, it is intended that the invention not be limited by any of the details of description, unless otherwise specified, but rather be construed broadly within its spirit and scope as set forth in the accompanying claims.

What is claimed is:

1. A T-shape vortex shedder disposed within a circular pipe through which fluid flows for producing a vortex in the fluid flow, comprising:
    an extended plate having a central plane and a length L in a flow direction; and
    a generally linear bluff body extending diametrically across the circular pipe and having a front surface of a width W facing the fluid flow and an outer peripheral surface, the front surface being perpendicular to the central plane of said extended plate, the extended plate being secured to said bluff body;
    wherein a ratio L/W of the length L of said extended plate in the flow direction to the width W of the front surface of said bluff body is within the range of 1.56 to 2.0, whereby steady vortex shedding is maintained when the Reynolds number of the fluid flow in the circular pipe is between $2.4 \times 10^3$ and $3.2 \times 10^4$.

2. A T-shape vortex shedder as claimed in claim 1, wherein said bluff body is provided with two pressure taps respectively formed near first and second intersections of the front surface and the outer peripheral surface of said bluff body, said two pressure taps being communicated with a pressure transducer disposed outside of the circular pipe.

3. A T-shape vortex shedder as claimed in claim 1, wherein the ratio of said front surface area of the bluff body to the inside cross sectional area of the circular pipe is approximately 0.2703.

4. A method for calculating a fluid flowrate, comprising the steps of:
    (a) providing a T-shape vortex shedder with a bluff body having a width W across a front surface thereof and placing said T-shape vortex shedder diametrically across the inside of a pipe having a fluid flow therethrough;
    (b) providing a pressure transducer in communication with said T-shape vortex shedder;
    (c) measuring a frequency f of vortex shedding caused by said T-shape vortex shedder by using said pressure transducer;
    (d) calculating the fluid flowrate using a predetermined relationship between said frequency f and the flow rate; and
    (e) providing said T-shape vortex shedder with an extended plate having a length L in a flow direction such that a ratio of L/W is between 1.56 and 2.0.

5. A method for calculating a fluid flowrate according to claim 4, further comprising determining said predetermined relationship when said Reynolds number Re is between $2.4 \times 10^3$ and $3.2 \times 10^4$.

6. A T-shape vortex shedder disposed within a circular pipe through which fluid flows for producing a vortex in the fluid flow, comprising:
    a bluff body disposed diametrically across the circular pipe and having a front surface of a width W facing the fluid flow;
    an extended plate secured to said bluff body having a central plane and a length L in a flow direction, said central plane extending perpendicular to said front surface of the bluff body;
    wherein a ratio L/W of the length L of the extended plate and the width W of the front surface of the bluff body is within a range of 1.56 to 2.0.

7. The T-shape vortex shedder as claimed in claim 6, further comprising a pressure transducer disposed outside of the circular pipe, said bluff body including first and second outer sides extending rearwardly from the front surface of the bluff body, and pressure transmit passages extending from said first and second outer sides to said pressure transducer.

8. The T-shape vortex shedder as claimed in claim 7, wherein said pressure transmit passages have openings formed in said first and second outer sides of said bluff body near a midpoint of said circular pipe.

* * * * *